May 5, 1953 E. A. SCHONROCK 2,637,593
LIFTING DEVICE FOR DUMP TRAILERS
Filed Jan. 22, 1951 3 Sheets-Sheet 1

INVENTOR.
Edwin A. Schonrock
BY
Attorneys

May 5, 1953  E. A. SCHONROCK  2,637,593
LIFTING DEVICE FOR DUMP TRAILERS
Filed Jan. 22, 1951  3 Sheets-Sheet 2
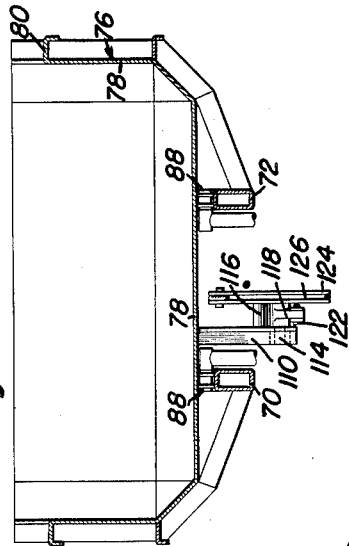
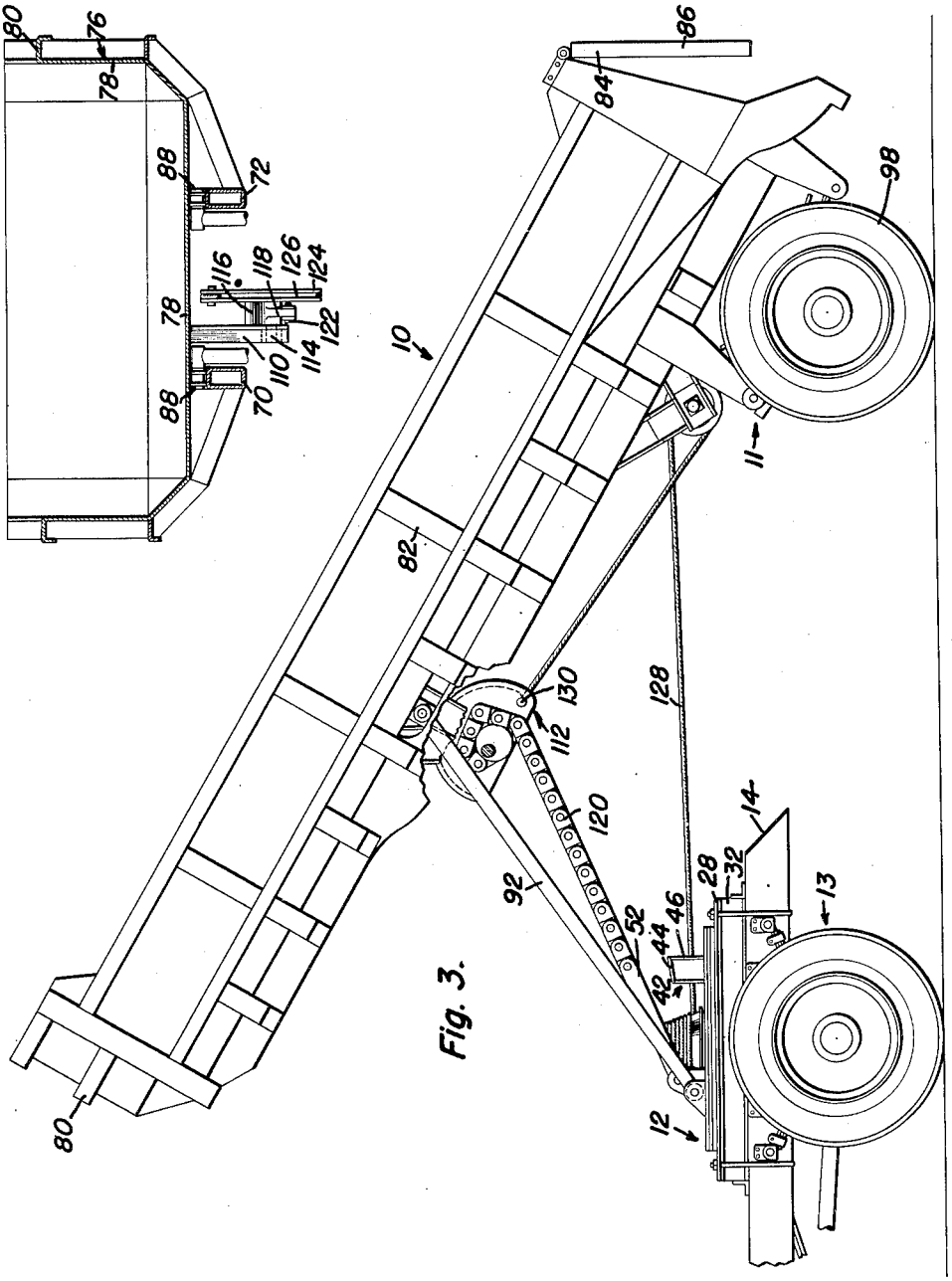
Edwin A. Schonrock
INVENTOR.

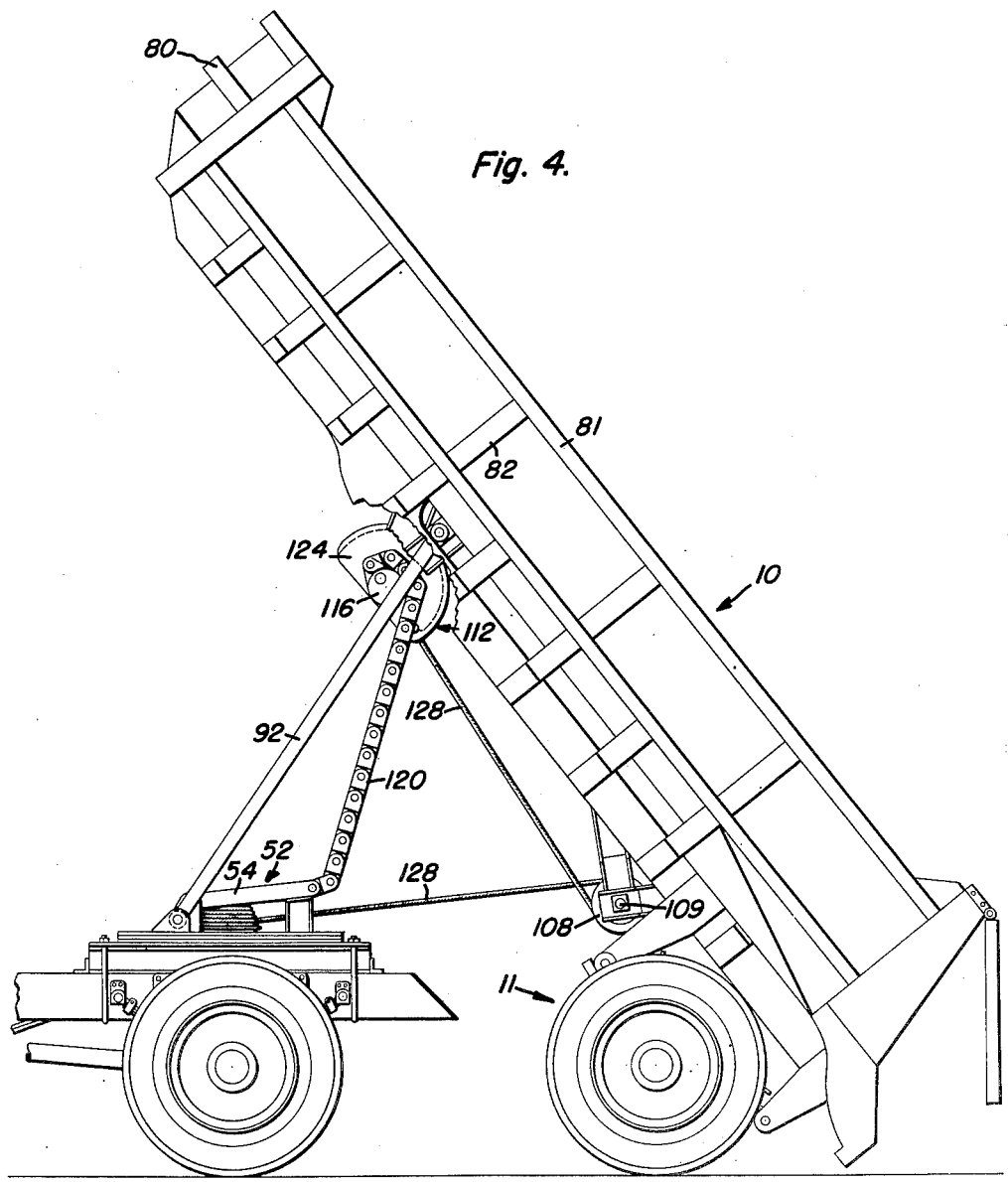

Patented May 5, 1953

2,637,593

UNITED STATES PATENT OFFICE 2,637,593

LIFTING DEVICE FOR DUMP TRAILERS

Edwin A. Schonrock, San Angelo, Tex.

Application January 22, 1951, Serial No. 207,158

19 Claims. (Cl. 298—20)

The present invention relates to improvements in trailer type vehicles and more particularly to a lifting mechanism for effecting tilting of the body of the vehicle to a load dumping position. The present invention constitutes an improvement on my previous patent, No. 2,517,933, issued August 8, 1950.

An object of the present invention is to provide a mechanism for effecting tilting of the body of a trailer type vehicle and wherein the mechanism includes a compound lever arrangement for interconnecting the body with the fifth wheel of the tractor unit and whereby the supporting wheels for the body are adapted to move forwardly with respect to the tractor unit upon upward tilting of the body.

A further object of the present invention resides in the provision of a novel cam lever means rotatably disposed between the longitudinal side members of the body and wherein the cam lever means is provided with a chain drum, the cam lever means having a cable connected thereto for effecting rotating movement of the cam lever means in response to rotation of the winch on the fifth wheel whereby the chain drum will be rotated for effecting relative movement between the rear wheels of the body and the cab of the vehicle.

Another object of the present invention resides in the provision of a chain and lever connection between the chain drum and the fifth wheel whereby rotation of the cam lever means in response to winding of the cable on the winch effects winding of the chain on the chain drum to draw the rear wheels support of the body forwardly and towards the cab of the vehicle.

Still another object of the present invention resides in the eccentric mounting of the cam lever means and cable drum whereby rotation of the cam lever means accomplishes effective winding of the chain on the chain drum as a result of the added mechanical advantage afforded by the eccentricity.

Still further objects of the present invention will appear more fully in the detailed disclosure to follow. The best form in which I have contemplated applying my invention is clearly illustrated in the accompanying drawings, wherein:

Figure 3 is a side elevational view of the dump vehicle with parts broken away and showing the dump body in raised position in response to winding of the cable on the winch, the rear wheel assembly of the dump body being moved forwardly as a result of the draft effected by winding of the chain on the chain drum;

Figure 4 is a side elevational view similar to Figure 3 but wherein the dump body is in its uppermost tilted position; and Figure 5 is a vertical transverse sectional view taken substantially along the plane of line 5—5 of Figure 1.

Figure 1:
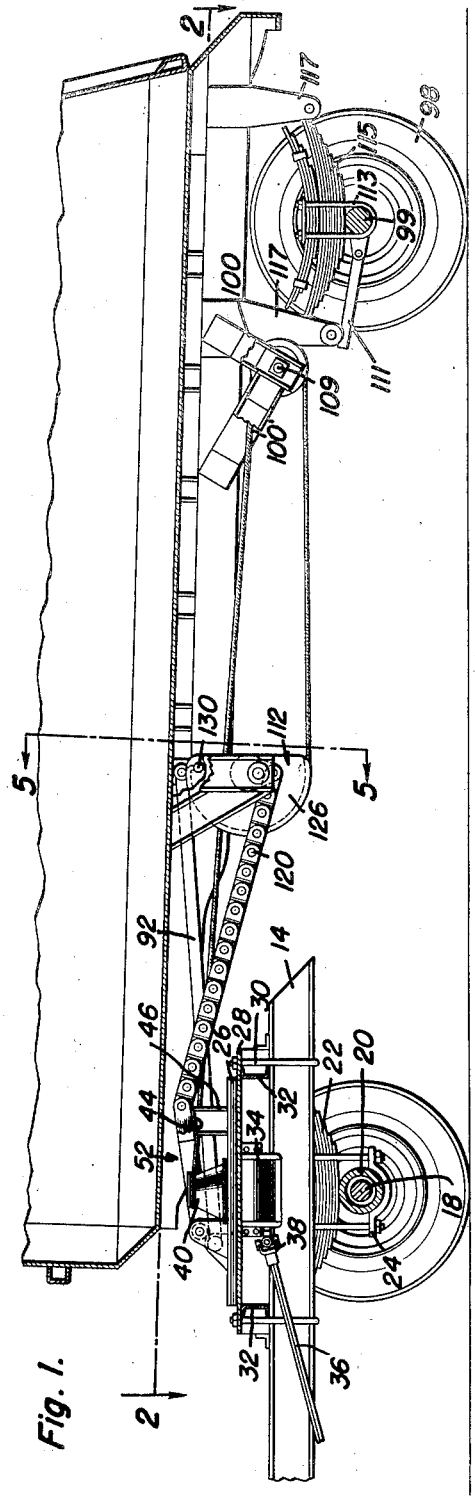
Figure 1 is a vertical longitudinal sectional view of the cable dump trailer and showing the dump body in its lowermost position.
Figure 2:
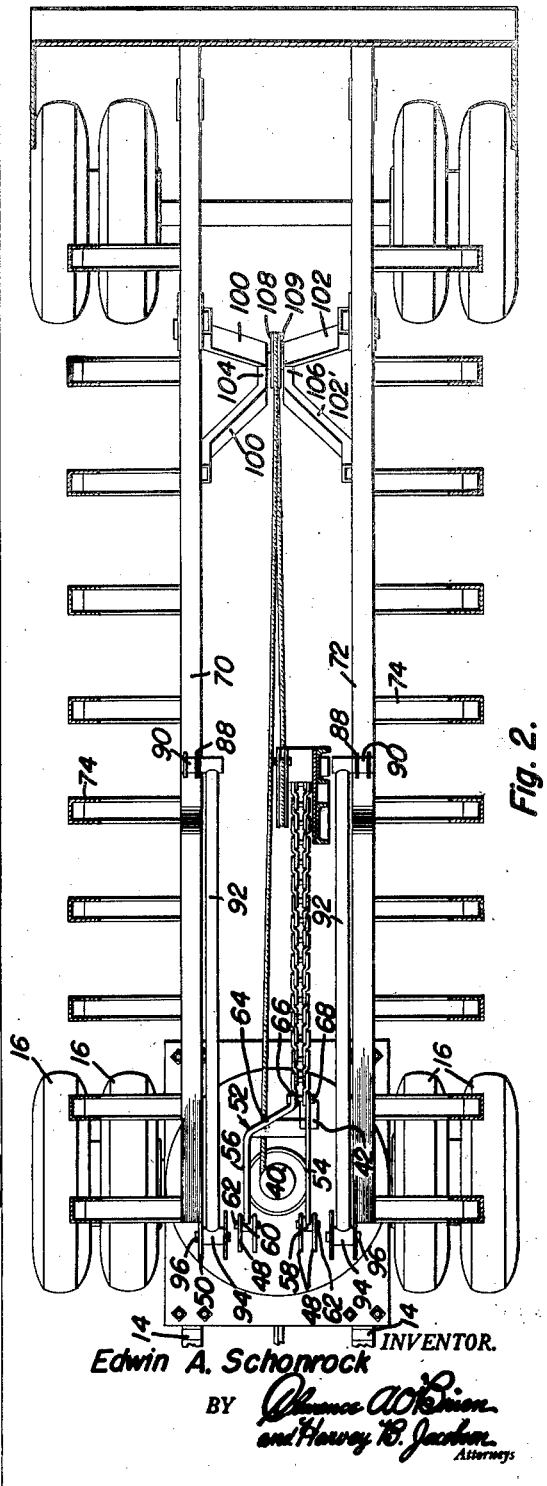
Figure 2 is a horizontal longitudinal sectional view taken substantially along the plane of line 2—2 of Figure 1.

Referring more particularly to the drawings, wherein like numerals designate like parts throughout, the numeral 10 designates generally a substantially conventional dump body and wheel support while the numeral 12 designates generally the fifth wheel assembly and supporting wheels of the tractor unit, hereinafter referred to as the cab for brevity, of the vehicle.

The fifth wheel assembly and supporting wheels are substantially of conventional form and include the longitudinal frame members 14 of the cab with the double pairs of wheels 16 having their axle 18 rotatably supported in the housing 20 with a conventional spring arrangement 22 and bracket attachment 24 for connecting the wheels to the frame members 14. The fifth wheel includes a circular disk 26 which is rotatably mounted on the plate 28, which is in turn secured by means of the bolts 30 to the frame members 14, channel iron members 32 supporting the plate 28 in spaced relation to the frame members 14. The gear housing 34 is secured to the underside of the plate 28 and has a drive shaft 36 connected thereto by means of the universal joint 38 whereby power from the power take-off unit of the cab can be interconnected with the winch 40 rotatably disposed on disk 26. The winch 40 is interconnected with the drive shaft 36 through the gearing of the gear housing 34 whereby a predetermined winding rate of the winch 40 can be effected.

The disk 26 also has a stop member 42 fixedly supported thereon and comprised of a substantially rectangularly cross sectioned element having an inclined upper surface 44 integrally secured to the upstanding wall 46 of the stop element.

The disk 26 also has mounted thereon a first set of pairs of ears 48 and a second set of pairs of ears 50 of larger size than the ears 48, the first set of ears 48 being disposed between the second pair of ears 50.

A lever means 52 is pivotally supported on the ears 48 and is comprised of a pair of flat straps 54 and 56 terminating at end portions in sleeves 58 and 60, the sleeves 58 and 60 being disposed between the pairs of ears 48 and having pins 62 extending therethrough for rotatably supporting the lever means 52. The lever element 56 has an angularly extending portion 64 which has an end portion 66 pivotally secured in juxtaposition to the free end portion of the lever element 54 by a pin 68 interconnecting the said end portions.

The dump body and wheel assembly 10 is substantially of conventional form and includes a pair of longitudinally extending frame side members 70 and 72 of rectangular cross section with a plurality of transversely extending longitudinally spaced cross members 74 secured to the side members and maintaining the side members in spaced parallel relation. The dump body 76 is comprised of a shell 78 with reinforcing elements 80 secured thereto, vertically disposed reinforcing elements 82 being similarly secured to the shell 78. The shell 78 is supported on the cross members 74 and secured thereto by any desired conventional means.

The dump body 76 is also formed with an endgate frame 84 with an endgate 86 hingedly connected thereto for selectively closing the end of the dump body from dumping.

Inasmuch as the specific details of the construction of the dump body forms no part of the present invention, it is merely broadly described to provide a basis for the description of the means for effecting tilting of the dump body. It is to be understood that dump bodies of various other forms could be employed without departing from the real spirit and purpose of the invention as defined by the appended claims. Accordingly, further description of the dump body is deemed unnecessary.

Each of the side members 70 and 72 has a bearing bracket 88 secured to its upper side for pivotally receiving the bearing portions 90. A pair of arms 92 are integrally secured to the bearing elements 90 for pivotal support thereby, the opposite ends of the arms 92 having sleeves 94 secured thereto with pins 96 extending therethrough whereby the arms 92 can be pivotally supported by the sets of pairs of ears 50 on the disk 26.

It will thus be seen that movement between the body 10 and the fifth wheel 12 can be accomplished upon tilting of the dump body with respect to the horizontal accompanied by forward movement of the supporting wheels 98 for the dump body 10.

A pair of channel iron bearing brackets 100 and 102 are fixedly secured to the inner faces of the side members 70 and 72 and have bearing portions 104 and 106 juxtaposed to each other for rotatably supporting the sheave 108 therebetween by an axle or pin 109. The sheave 108 is disposed in a vertical plane and is in longitudinal alignment with the winch body although lying in a plane perpendicular to the horizontal plane of the winch.

As seen best in Figure 5, a cam lever bearing bracket 110 is secured to the underside of the shell 78 in a position between the side members 70 and 72. A cam lever means 112 is rotatably supported by the cam lever bracket 110, a shaft 114 extending through the bracket 110 and fixedly connected to the cam lever means 112. Disposed between the cam lever bracket 110 and the cam lever means 112 is the chain drum 116 which is secured to the cam lever means 112 for rotation therewith and has an ear 118 integrally formed therewith and extending therefrom.

A chain 120 interconnects the lever elements 54 and 56 to the chain drum 116 by means of the pin 68 at one end and the pin 122 through the ear 118 at the other end.

The lever means 112 is comprised of a substantially semicircular disk 124 having a peripheral groove 126 formed in its arcuate surface and is eccentrically and fixedly mounted on the shaft 114.

A cable 128 is secured to the winch 40 for winding thereon and an intermediate portion of the cable 128 extends over the sheave 108 and then passes to the cam lever disk 124 where it is secured by means of the pin 130, the end portion of the cable 128 being secured to an end portion of the arcuate surface of the disk and adjacent to the flattened portion of the disk.

Of course, the wheel assembly 11 of the dump body 10 is substantially of conventional form and includes the wheels 98 having the axle 99 supporting the same and the axle 99 supporting the dump body 10 by means of the springs 115 and U-shaped clamp 113 with the brackets 117 interconnecting the springs 115 with the frame of the body 10. Shock absorbers 111 may also be employed as desired.

As seen best in Figure 1, the dump trailer is shown in its non-tilted position with the cable 128 in its untensioned position and the chain 120 outstretched and interconnecting the lever means 52 with the chain drum 116. When it is desired to tilt the dump body, the power take-off drive shaft 36 is actuated thereby effecting rotation of the winch 40 and causing winding of the cable 128 on the winch 40. Inasmuch as the cable 128 is disposed on the arcuate surface of the cam lever disk 124, the winding of the cable will effect counter-clockwise rotation of the cam lever disk 124 about its pin 114. Thus, the drum 116 will be rotated counter-clockwise and will have the chain 120 wound thereon as shown in Figure 3. The winding of the chain 120 on the drum 116 effects a draft of the dump trailer thereby causing the dump trailer to move forwardly with respect to the cab. Inasmuch as the arms 92 interconnect an intermediate portion of the dump body with the fifth wheel of the cab, the dump body will be tilted upwardly as it moves forwardly. The cam lever disk 124 will now be in its extreme pivoted position and further winding of the cable 128 on the winch body will, without further rotation of 112, effect further relative movement between the trailer and the cab thus causing the rear wheel assembly 11 to move forwardly to the position shown in Figure 4, thereby further effecting tilting of the dump body with respect to the horizontal until the dump body reaches its uppermost position while the tension of the chain is now released and the latter sags into the position shown in Figure 4.

Of course, various mechanical modifications and substitutions may be made without departing from the spirit of the present invention and it is my intention to cover such modifications and substitutions within the scope of the claims hereinafter appended.

Having described the invention, what is claimed as new is:

1. A lifting mechanism for a dump trailer having a load carrying body, a fifth wheel supported on the frame of the cab of said trailer, said mechanism including winch means, a first arm pivotally connected at its ends to said fifth wheel and to said body respectively, a cam lever means rotatably supported upon said body, and having a cam surface thereon, a cable windable on said winch means and connected to said cam lever means and entrained over said cam surface for engagement thereover.

2. A lifting mechanism for a dump trailer having a load carrying body, a fifth wheel supported on the frame of the cab of said trailer, said mechanism including winch means connected to the power take-off of said cab, a first arm pivotally connected at its ends to said fifth wheel and said body respectively, a cam lever means rotatably supported upon said body, and having a cam surface thereon, a cable windable on said winch means, a pulley rotatably supported by said body at a position rearwardly of said cam lever means, and said cable extending from said winch means to said pulley for engagement therewith and having its free end connected to said cam lever means and entrained over said cam surface for engagement thereover.

3. A lifting mechanism for a dump trailer having a load carrying body, a fifth wheel supported on the frame of the cab of said trailer, said mechanism including winch means connected to the power take-off of said cab, a first arm pivotally connected at its ends to said fifth wheel and to said body respectively, a cam lever means rotatably supported upon said body, a cable windable on said winch means and connected to said cam lever means for engagement thereover, said cam lever means having a chain drum connected for rotation therewith, a draft chain connected to said chain drum and to said fifth wheel.

4. A lifting mechanism for a dump trailer having a load carrying body, a fifth wheel supported on the frame of the cab of said trailer, said mechanism including winch means connected to the power take-off of said cab, a first arm pivotally connected at its ends to said fifth wheel and to said body respectively, a cam lever means rotatably supported upon said body, a cable windable on said winch means and connected to said cam lever means for engagement thereover, said cam lever means having a chain drum connected for rotation therewith, a draft chain interconnecting said fifth wheel and said chain drum, said draft chain being adapted to be wound on said chain drum upon rotation of said cam lever means in response to winding of said cable.

5. A lifting mechanism for a dump trailer having a load carrying body, a fifth wheel supported on the frame of the cab of said trailer, said mechanism including winch means connected to the power take-off of said cab, a first arm pivotally connected at its ends to said fifth wheel and to said body respectively, a cam lever means rotatably supported upon said body, a cable windable on said winch means and connected to said cam lever means for engagement thereover, said cam lever means having a chain drum connected for rotation therewith, a lever pivotally secured to said fifth wheel, a stop on said fifth wheel positioned for engagement by said lever when the lever is in its lowermost position, a draft chain interconnecting said fifth wheel and said chain drum, said draft chain being adapted to be wound on said chain drum upon rotation of said cam lever means in response to winding of said cable.

6. A lifting mechanism for a dump trailer having a load carrying body, a fifth wheel supported on the frame of the cab of said trailer, said mechanism including winch means connected to the power take-off of said cab, a first arm pivotally connected at its ends to said fifth wheel and to said body respectively, a cam lever means rotatably supported upon said body, a cable windable on said winch means, a pulley rotatably supported between said side members at a position rearwardly of said cam lever means, and said cable extending from said winch means to said pulley for engagement therewith and having its free end connected to said cam lever means for engagement thereover, said cam lever means having a chain drum connected for rotation therewith.

7. A lifting mechanism for a dump trailer having a load carrying body, a fifth wheel supported on the frame of the cab of said trailer, said mechanism including winch means connected to the power take-off of said cab, a first arm pivotally connected at its ends to said fifth wheel and to said body respectively, a cam lever means rotatably supported between said side members and a cable windable on said winch means, a pulley rotatably supported upon said body at a position rearwardly of said cam lever means, and said cable extending from said winch means to said pulley for engagement therewith and having its free end connected to said cam lever means for engagement thereover, said cam lever means having a chain drum connected for rotation therewith, a draft chain interconnecting said fifth wheel and said chain drum, said draft chain being adapted to be wound on said chain drum upon rotation of said cam lever means in response to winding of said cable.

8. A lifting mechanism for a dump trailer having a load carrying body, a fifth wheel supported on the frame of the cab of said trailer, said mechanism including winch means connected to the power take-off of said cab, a first arm pivotally connected at its ends to said fifth wheel and to said body respectively, a cam lever means rotatably supported upon said body, a cable windable on said winch means, a pulley rotatably supported upon said body at a position rearwardly of said cam lever means, and said cable extending from said winch means to said pulley for engagement therewith and having its free end connected to said cam lever means for engagement thereover, said cam lever means having a chain drum connected for rotation therewith, a lever pivotally secured to said fifth wheel, a stop on said fifth wheel positioned for engagement by said lever when the lever is in its lowermost position, a draft chain interconnecting said lever and said chain drum, said draft chain being adapted to be wound on said chain drum upon rotation of said cam lever means in response to winding of said cable.

9. A lifting mechanism for a dump trailer having a load carrying body, a fifth wheel supported on the frame of the cab of said trailer, said mechanism including winch means connected to the power take-off of said cab, a first arm pivotally connected at its ends to said fifth wheel and to said body respectively, a cam lever means rotatably supported upon said body, a cable windable on said winch means and connected to said cam lever means for engagement thereover, said lever means including an eccentrically mounted substantially semi-circular disk, said cable having one end connected to a first portion of said disk and positioned over the arcuate surface of said disk whereby winding of the cable on said winch effects rotation of said disk.

10. A lifting mechanism for a dump trailer having a load carrying body, a fifth wheel supported on the frame of the cab of said trailer, said mechanism including winch means connected to the power take-off of said cab, a first arm pivotally connected at its ends to said fifth wheel and to said body respectively, a cam lever means rotatably supported upon said body, a cable windable on said winch means, a pulley rotatably supported upon said body at a position rearwardly of said cam lever means, and said cable extending from said winch means to said pulley for engagement therewith and having its free end connected to said cam lever means for engagement thereover, said cam lever means including an eccentrically mounted substantially semi-circular disk, said cable having one end connected to a first portion of said disk and positioned over the arcuate surface of said disk whereby winding of the cable on said winch effects rotation of said disk.

11. A lifting mechanism for a dump trailer having a load carrying body, a fifth wheel supported on the frame of the cab of said trailer, said mechanism including winch means connected to the power take-off of said cab, a first arm pivotally connected at its ends to said fifth wheel and to said body respectively, a cam lever means rotatably supported upon said body, a cable windable on said winch means, a pulley rotatably supported upon said body at a position rearwardly of said cam lever means, and said cable extending from said winch means to said pulley for engagement therewith and having its free end connected to said cam lever means for engagement thereover, said cam lever means having a chain drum connected for rotation therewith, said cam lever means including an eccentrically mounted substantially semi-circular disk, said cable having one end connected to a first portion of said disk and positioned over the arcuate surface of said disk whereby winding of the cable on said winch effects rotation of said disk.

12. A lifting mechanism for a dump trailer having a load carrying body, a fifth wheel supported on the frame of the cab of said trailer, said mechanism including winch means connected to the power take-off of said cab, a first arm pivotally connected at its ends to said fifth wheel and to said body respectively, a cam lever means rotatably supported upon said body, a cable windable on said winch means, a pulley rotatably supported upon said body at a position rearwardly of said cam lever means, and said cable extending from said winch means to said pulley for engagement therewith and having its free end connected to said cam lever means for engagement thereover, said cam lever means having a chain drum connected for rotation therewith, a draft chain interconnecting said fifth wheel and said chain drum, said draft chain being adapted to be wound on said chain drum upon rotation of said cam lever means in response to winding of said cable, said cam lever means including a substantially semi-circular disk, said cable having one end connected to a first portion of said disk and positioned over the arcuate surface of said disk whereby winding of the cable on said winch effects rotation of said disk.

13. A lifting mechanism for a dump trailer having a load carrying body, a fifth wheel supported on the frame of the cab of said trailer, said mechanism including winch means connected to the power take-off of said cab, a first arm pivotally connected at its ends to said fifth wheel and to said body respectively, a cam lever means rotatably supported upon said body, a cable windable on said winch means, a pulley rotatably supported upon said body at a position rearwardly of said cam lever means, and said cable extending from said winch means to said pulley for engagement therewith and having its free end connected to said cam lever means for engagement thereover, said cam lever means having a chain drum connected for rotation therewith, a lever pivotally secured to said fifth wheel, a stop on said fifth wheel positioned for engagement by said lever when the lever is in its lowermost position, a draft chain interconnecting said fifth wheel and said chain drum, said draft chain being adapted to be wound on said chain drum upon rotation of said cam lever means in response to winding of said cable, said cam lever means including an eccentrically mounted substantially semi-circular disk, said cable having one end connected to a first portion of said disk and positioned over the arcuate surface of said disk whereby winding of the cable on said winch effects rotation of said disk.

14. A lifting mechanism for a dump trailer having a load carrying body, a fifth wheel supported on the frame of the cab of said trailer, said mechanism including winch means connected to the power take-off of said cab, a first arm pivotally connected at its ends to said fifth wheel and to said body respectively, a cam lever means rotatably supported upon said body, a cable windable on said winch means and connected to said cam lever means for engagement thereover, said lever means including a substantially semi-circular disk, said cable having one end connected to a first portion of said disk and positioned over the arcuate surface of said disk whereby winding of the cable on said winch effects rotation of said disk, said disk being eccentrically rotatably supported.

15. A lifting mechanism for a dump trailer having a load carrying body, a fifth wheel supported on the frame of the cab of said trailer, said mechanism including winch means connected to the power take-off of said cab, a first arm pivotally connected at its ends to said fifth wheel and to said body respectively, a cam lever means rotatably supported upon said body, a cable windable on said winch means and connected to said cam lever means for engagement thereover, said cam lever means having a chain drum connected for rotation therewith, said lever means including a substantially semi-circular disk, said cable having one end connected to a first portion of said disk and positioned over the arcuate surface of said disk whereby winding of the cable on said winch effects rotation of said disk, said disk being eccentrically rotatably supported.

16. A lifting mechanism for a dump trailer having a load carrying body, a fifth wheel supported on the frame of the cab of said trailer, said mechanism including winch means connected to the power take-off of said cab, a first arm pivotally connected at its ends to said fifth wheel and to said body respectively, a cam lever means rotatably supported upon said body, a cable windable on said winch means and connected to said cam lever means for engagement thereover, said cam lever means having a chain drum connected for rotation therewith, a draft chain interconnecting said fifth wheel and said chain drum, said draft chain being adapted to be wound on said chain drum upon rotation of said cam lever means in response to winding of said cable, said lever means including a substantially semi-circular disk, said cable having one end connected to a first portion of said disk and positioned over the arcuate surface of said disk whereby winding of the cable on said winch effects rotation of said disk, said disk being eccentrically rotatably supported.

17. A lifting mechanism for a dump trailer having a load carrying body, a fifth wheel supported on the frame of the cab of said trailer, said mechanism including winch means connected to the power take-off of said cab, a first arm pivotally connected at its ends to said fifth wheel and to said body respectively, a cam lever means rotatably supported upon said body, a cable windable on said winch means, a pulley rotatably supported upon said body at a position rearwardly of said cam lever means, and said cable extending from said winch means to said pulley for engagement therewith and having its free end connected to said cam lever means for engagement thereover, said cam lever means having a chain drum connected for rotation therewith, said lever means including a substantially semi-circular disk, said cable having one end connected to a first portion of said disk and positioned over the arcuate surface of said disk whereby winding of the cable on said winch effects rotation of said disk, said disk being eccentrically rotatably supported.

18. A lifting mechanism for a dump trailer having a load carrying body, a fifth wheel supported on the frame of the cab of said trailer, said mechanism including winch means connected to the power take-off of said cab, a first arm pivotally connected at its ends to said fifth wheel and said body respectively, a cam lever means rotatably supported upon said body, a cable windable on said winch means, a pulley rotatably supported upon said body at a position rearwardly of said cam lever means, and said cable extending from said winch means to said pulley for engagement therewith and having its free end connected to said cam lever means for engagement thereover, said cam lever means having a chain drum connected for rotation therewith, a draft chain interconnecting said fifth wheel and said chain drum, said draft chain being adapted to be wound on said chain drum upon rotation of said cam lever means in response to winding of said cable, said lever means including a substantially semi-circular disk, said cable having one end connected to a first portion of said disk and positioned over the arcuate surface of said disk whereby winding of the cable on said winch effects rotation of said disk, said disk being eccentrically rotatably supported.

19. In a tractor and trailer combination of the type consisting of a tractor having a frame with a cab, a frame and an engine driven winch on said frame and a trailer having a load carrying body; a lifting mechanism for said tractor comprising a lift arm having its opposite ends pivoted to said body and to the tractor frame, a cam lever means rotatably supported upon said body, a cable windable on said winch means and connected for rotation therewith, a draft chain interconnecting said chain drum and said tractor frame, said draft chain being adapted to be wound on said chain drum upon rotation of said cam lever means in response to winding of said cable.

EDWIN A. SCHONROCK.

References Cited in the file of this patent

UNITED STATES PATENTS

| Number | Name | Date |
|---|---|---|
| 2,159,470 | Cederstrom | May 23, 1939 |
| 2,309,787 | Quintin et al. | Feb. 2, 1943 |
| 2,517,933 | Schonrock | Aug. 8, 1950 |
| 2,542,795 | Clement et al. | Feb. 20, 1951 |